United States Patent
Pellengo Gatti et al.

(10) Patent No.: US 11,491,680 B2
(45) Date of Patent: Nov. 8, 2022

(54) METHOD AND APPARATUS FOR PERFORATING A FILM OF PLASTIC MATERIAL

(71) Applicant: No. EL. S.R.L., San Pietro Mosezzo (IT)

(72) Inventors: Roberto Pellengo Gatti, San Pietro Mosezzo (IT); Maurizio Gnappa, San Pietro Mosezzo (IT)

(73) Assignee: No. EL. S.R.L., San Pietro Mosezzo (IT)

( * ) Notice: Subject to any disclaimer, the term of this patent is extended or adjusted under 35 U.S.C. 154(b) by 742 days.

(21) Appl. No.: 15/773,244

(22) PCT Filed: Nov. 8, 2016

(86) PCT No.: PCT/EP2016/076971
§ 371 (c)(1),
(2) Date: May 3, 2018

(87) PCT Pub. No.: WO2017/081000
PCT Pub. Date: May 18, 2017

(65) Prior Publication Data
US 2018/0319034 A1    Nov. 8, 2018

(30) Foreign Application Priority Data
Nov. 9, 2015  (IT) .......................... UB2015A005364

(51) Int. Cl.
*B26F 1/26* (2006.01)
*B29C 55/06* (2006.01)
(Continued)

(52) U.S. Cl.
CPC ................ *B26F 1/26* (2013.01); *B26F 3/004* (2013.01); *B26F 3/06* (2013.01); *B29C 55/06* (2013.01);
(Continued)

(58) Field of Classification Search
CPC . B29C 55/06; B29C 2793/0045; B32B 3/085; B26F 1/26
See application file for complete search history.

(56) References Cited

U.S. PATENT DOCUMENTS 3,805,649 A * 4/1974 Hester ...................... B31D 1/00
83/177
10,232,594 B2 * 3/2019 Mitchell .............. B29C 48/0018
(Continued)

FOREIGN PATENT DOCUMENTS

EP    0057483 A2    8/1982
EP    0138601 A2    4/1985
(Continued)

OTHER PUBLICATIONS

WO2004080695 machine translation (Year: 2004).*
Search Report and Written Opinion of PCT/EP2016/076971 dated Dec. 16, 2016.

*Primary Examiner* — Timothy Kennedy
*Assistant Examiner* — Alexander A Wang
(74) *Attorney, Agent, or Firm* — Silvia Salvadori, P.C.; Silvia Salvadori

(57) ABSTRACT

A method for perforating a film of plastic material in which the film is perforated whilst it is slid through a perforating device by a plurality of pressurised hot gas jets having a temperature above the melting temperature of the main film, in which the hot gas jets are correlated with the sliding speed of the main film, and in which reinforcing bands obtained from an auxiliary film of plastic material are connected to the perforated main film, making the reinforcing bands adhere between parallel rows of base holes. During perforating, the main film of plastic material is pressed against a perforating template, making the main film of plastic material instantaneously penetrate openings of the perforating template by said hot gas jets. A hot gas perforating device
(Continued)

and a suitable apparatus for perforating and stretching a film of plastic material are also provided.

12 Claims, 11 Drawing Sheets

(51) Int. Cl.
*B26F 3/00* (2006.01)
*B26F 3/06* (2006.01)
B29L 7/00 (2006.01)
B32B 3/08 (2006.01)
B32B 3/16 (2006.01)

(52) U.S. Cl.
CPC . *B29C 2793/0045* (2013.01); *B29L 2007/008* (2013.01); *B32B 3/085* (2013.01); *B32B 3/16* (2013.01)

(56) References Cited

U.S. PATENT DOCUMENTS

| | | | |
|---|---|---|---|
| 2010/0178456 A1* | 7/2010 | Kuroda | A61F 13/5116 428/136 |
| 2012/0148796 A1* | 6/2012 | Welch | B32B 5/022 428/137 |
| 2017/0274574 A1* | 9/2017 | Borse | B29C 48/022 |
| 2017/0320293 A1* | 11/2017 | Johanson | B32B 7/03 |

FOREIGN PATENT DOCUMENTS

| | | |
|---|---|---|
| GB | 909352 A | 10/1962 |
| GB | 1500365 A | 2/1978 |
| WO | 2004080695 A1 | 9/2004 |

\* cited by examiner

METHOD AND APPARATUS FOR PERFORATING A FILM OF PLASTIC MATERIAL

This application is a U.S. national stage of PCT/EP2016/076971 filed on 8 Nov. 2016, which claims priority to and the benefit of Italian Application No. UB2015A005364 filed on 9 Nov. 2015, the contents of which are incorporated herein by reference in their entireties.

BACKGROUND OF THE INVENTION

The present invention relates to a method, a device and an apparatus that are suitable for perforating and stretching a film of plastic material, which are used in the packing industry.

PRIOR ART

It is known that perforated extendible films of plastic material are used for packaging or wrapping palletised loads, bails of straw, products that are still hot during packaging, vegetable products or other types of product in such a manner as to provide suitable resistance to pulling of the film for packaging or binding of the load, and at the same time ensure sufficient ventilation of the load itself.

European document EP0909721 A1 discloses a perforated extendible film of plastic material provided with parallel rows of aerating holes and with longitudinal reinforcing elements that are suitable for increasing the resistance of the film in the pulling direction. Nevertheless, the perforated film is not stretched and the dimensions of the holes remain those set during the perforating step.

The holes are generally formed in the film of plastic material by thermal radiation or punching and have to be large enough to enable the products to be ventilated that have been wrapped with more than one layer of film of plastic material. The punch perforating method entails great wear to mechanical parts, such as the punches, to be replaced frequently, with resulting prolonged downtime, in addition to the production of waste plastic material to be disposed of. The cutting of the film of plastic material is moreover not neat and thus the edge of the holes is broken, increasing the risk of breakage of the film during binding of a load.

From patent document EP0820856 A1, a method is known for perforating by thermal radiation a film of stretched plastic material without contact with the film, without waste of material. This film is nevertheless not reinforced longitudinally and may thus be subject to breakages or tears during use; further, simple thermal radiation does not permit thorough control of perforating.

International patent document WO2004080695 discloses an apparatus and a method for perforating, stretching a film of plastic material after drilling and applying thereto reinforcing bands of plastic material. This document does not show or disclose any specific method or perforating device.

The patent document GB909352 B discloses a method for perforating a film of thermoplastic wherein a pressurised hot gas source is provided, having a temperature above the melting temperature of the main film.

Furthermore European patent documents EP0057483 A2 and EP0138601 A2 disclose similar methods for perforating a film of plastic material with no reference to pressurised hot gas.

Patent document GB1500365 A discloses a method for providing a plastics film packaging bag or sheet for wicket wherein only one hole is formed at a time.

Generally, the document quoted above relate to systems affected by problems linked to wear to the tools used, slowness of the process and thus low productivity, insufficient information on how to make the apparatus (especially in the case of thermal radiation) and the formation of holes with irregular edges.

None of the documents quoted above provides methods or apparatuses that are able to perforate a film of plastic material, without contact, generating aerating holes in the film having a reinforced regular edge, whilst the film of plastic material is slid at high speed through a perforating device, controlling the degree of stretching of the film.

OBJECTS OF THE INVENTION

A primary objective of the present invention is to provide a method and an apparatus that are suitable for perforating stretchable films of plastic material, which enable great control that permit great control of perforating with reinforced regular edges of the holes, maintaining high sliding speeds of the film and greater productivity than conventional perforating systems.

Other objectives are to achieve perforating without contact of the film and eliminate perforating waste.

Further, this method provides the possibility of varying the type of perforating, in particular the dimensions and pitch between the holes, and the alignment and staggering between contiguous rows of holes.

SHORT DESCRIPTION OF THE INVENTION

Such objects are achieved by a method, a device and an apparatus according to claims 1, 13 and 21.

SHORT DESCRIPTION OF THE DRAWINGS

In order to better understand the invention, an embodiment thereof is disclosed below by way of non-limiting example, illustrated in the attached drawings, in which.

DETAILED DESCRIPTION OF THE INVENTION

The invention relates to a method for perforating a film of plastic material. The film of plastic material can have different features, can be for example stretchable or heat-shrinkable.

Figure 1:
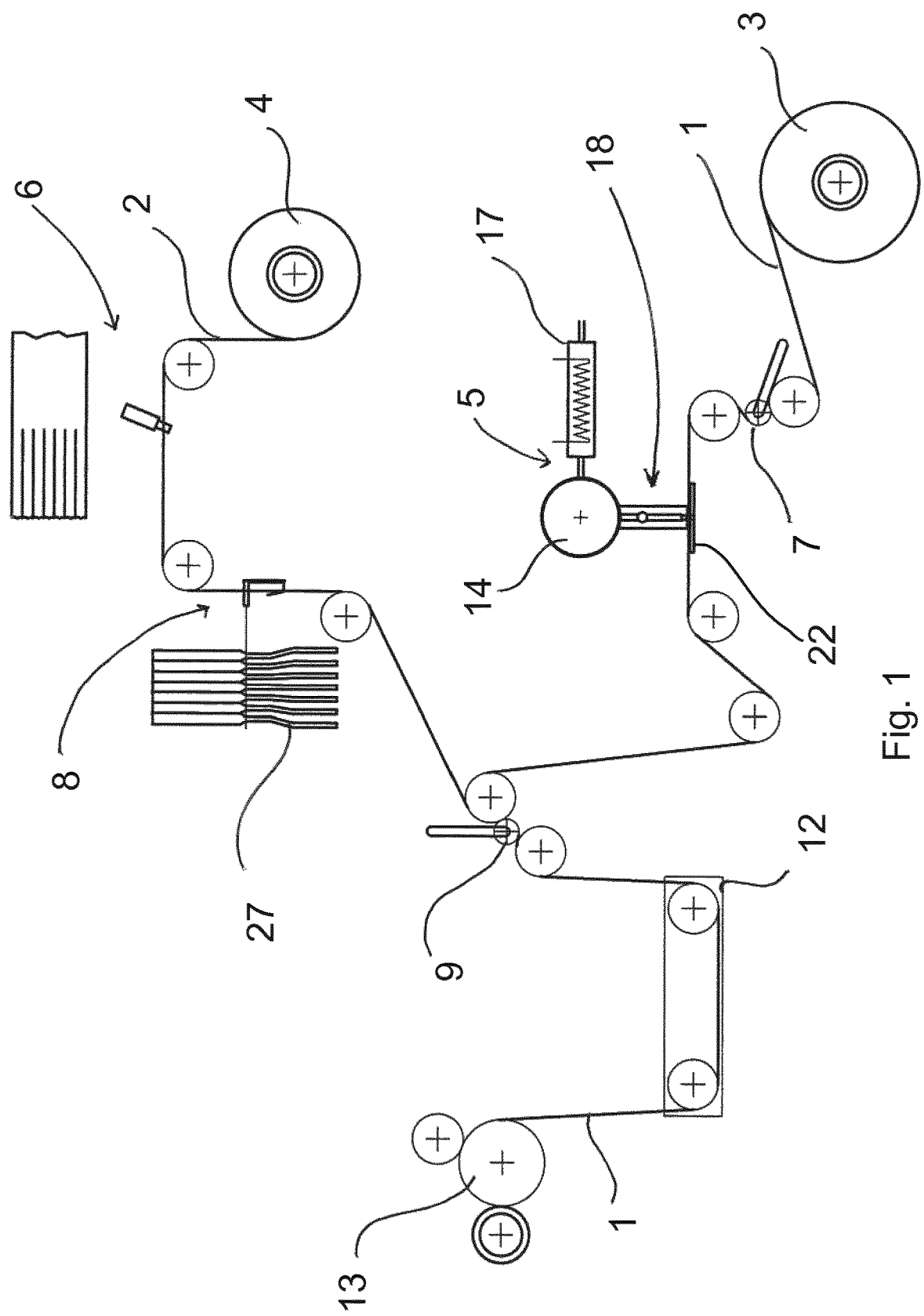
FIG. 1 shows a general diagram of the apparatus that is suitable for perforating a film of plastic material.

With reference to a non-limiting embodiment shown in FIG. 1, a first unwinding station, a first stretching (or prestretching) station for stretching a main film 1, a perforating station and a second stretching station for stretching a main film 1 make up a first perforating and stretching path of the main film 1. An unwinding station for unwinding the auxiliary film 2 and a device for longitudinal cutting 6 into strips 27 of an auxiliary film 2 make up a second forming path for forming the reinforcing bands 25. A folding device for folding the side edges 8 of the strips 27 of the auxiliary film 2 for forming the reinforcing bands 25 of the main film 1 and a subsequent applying station for applying the reinforcing bands 25 also belong to the second path.

The first step of stretching or prestretching the main film 1 is performed before perforating thereof; the second step of stretching the main film 1 is performed after the step of applying the reinforcing bands 25 to the perforated main film 1.

The first stretching or prestretching step can also not be performed, depending on production requirements.

The perforating device 5 for perforating by hot gas jets is in an intermediate position between the first and second stretching station of the main film 1.

The perforating device 5 enables base holes 24 to be created on the main film that, after the second stretching step, will become elongated holes 26 in the advancement direction of the main film 1.

In particular, still with reference to a non-limiting embodiment shown in FIG. 1, a main film 1 of plastic material is unwound, in a first unwinding station, by a main unwinding device 3 and moved in a longitudinal advancement direction along a perforating and stretching path. The main unwinding device 3 is driven by a motor, the latter operationally connected to a central control unit.

The main film 1 has a thickness comprised between 15-30 μm.

Once unwound, the main film 1 is advanced to a first stretching or prestretching station, to be used optionally, and subsequently, to a perforating device 5 to form a plurality of parallel rows of aerating base holes 24 in the longitudinal advancement direction of the main film 1. The perforating device 5 is of the hot gas jet type; the gas can be air or of another type.

Figure 2:
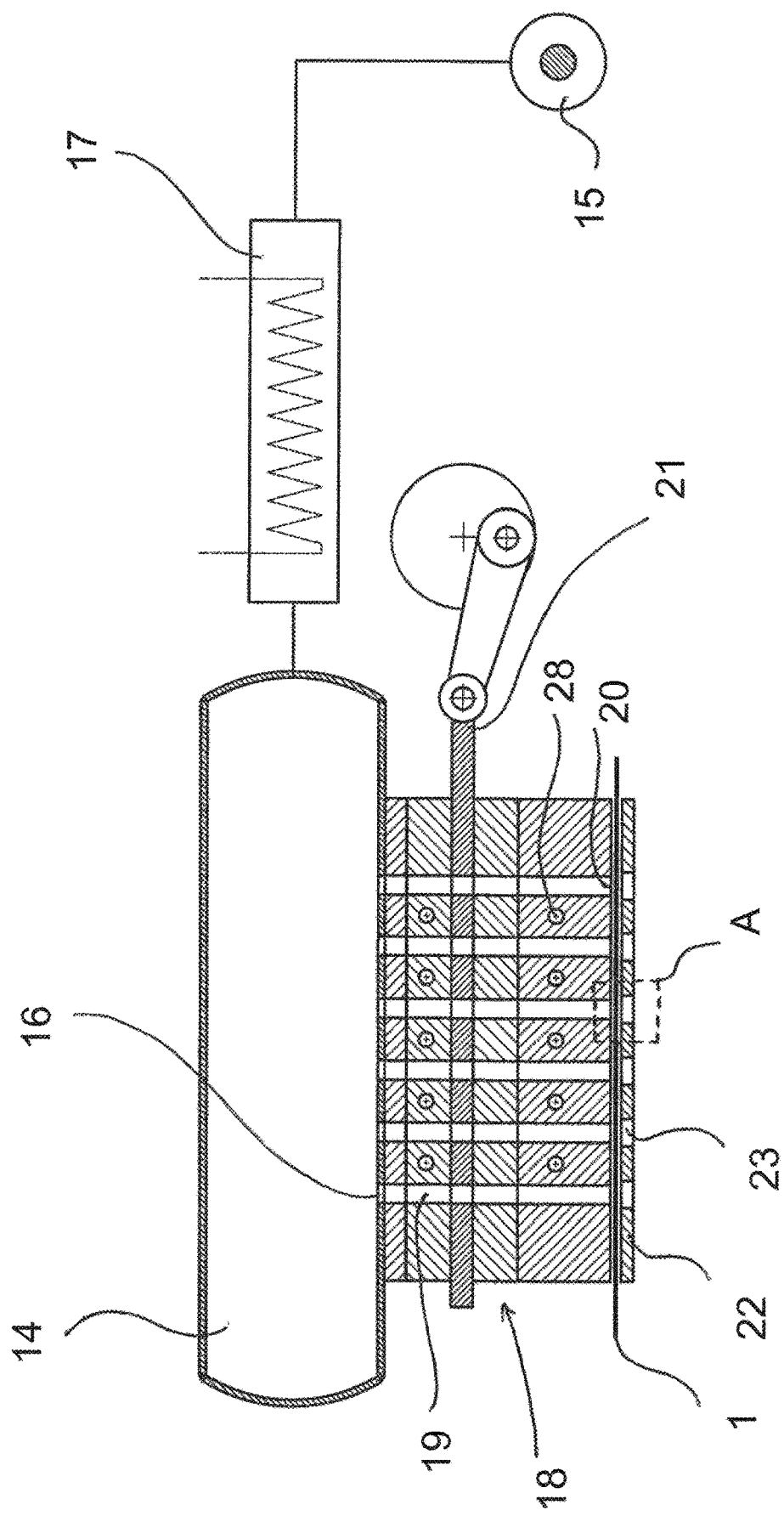
FIGS. 2 and 3 show side views of different embodiments of the device that is suitable for perforating a film of plastic material.

The perforating device 5, visible in FIG. 1 and in one embodiment thereof shown in detail in FIG. 2, comprises a tank 14 for pressurised storage of a hot gas. The storage tank 14 is connectable to a source of pressurised gas 15 to enable the supply thereof. The storage tank 14 can have different geometries, for example cylindrical or parallelpipedon, and is configured with a plurality of hot gas outlets 16. Heating device 17 is also present for heating the pressurised gas in the storage tank 14 to a temperature above the melting temperature of the film, for example by about 10-15%. The storage tank 14 is operationally connected to a hot gas distributor. The hot gas distributor 18 comprises a plurality of conveying channels 19 of the hot gas that extend between each outlet of the hot gas 16 of the storage tank 14 and a respective nozzle 20 for generating sequentially a plurality of pressurised gas jets correlated with the sliding speed of the main film 1. The nozzles 20 are configured in such a manner as to be aligned transversely to the longitudinal advancement direction of the film. The gas distributor 18 further comprises a valve device 21 that is drivable by actuating elements.

Figure 3:
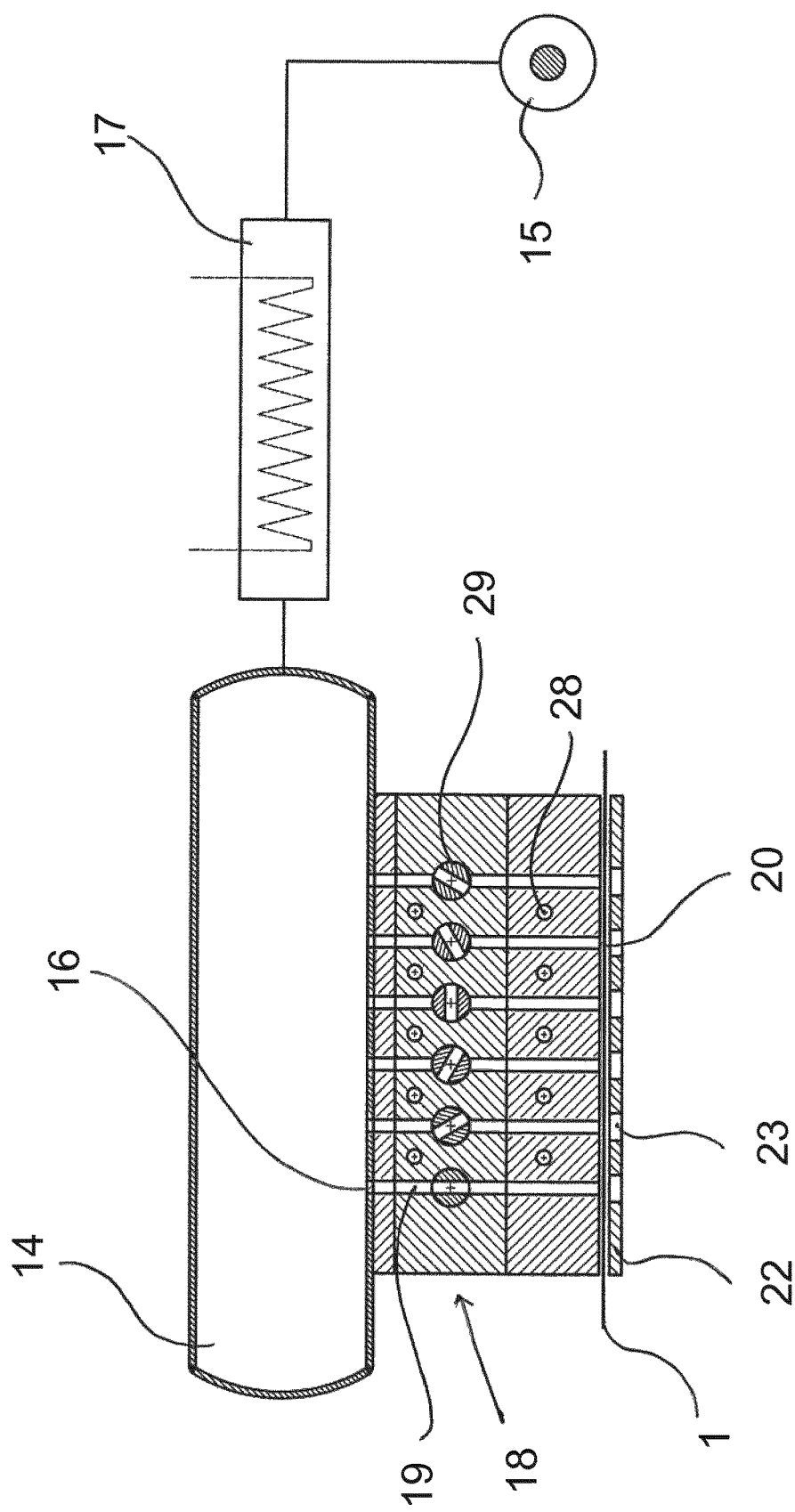
Figure 10:
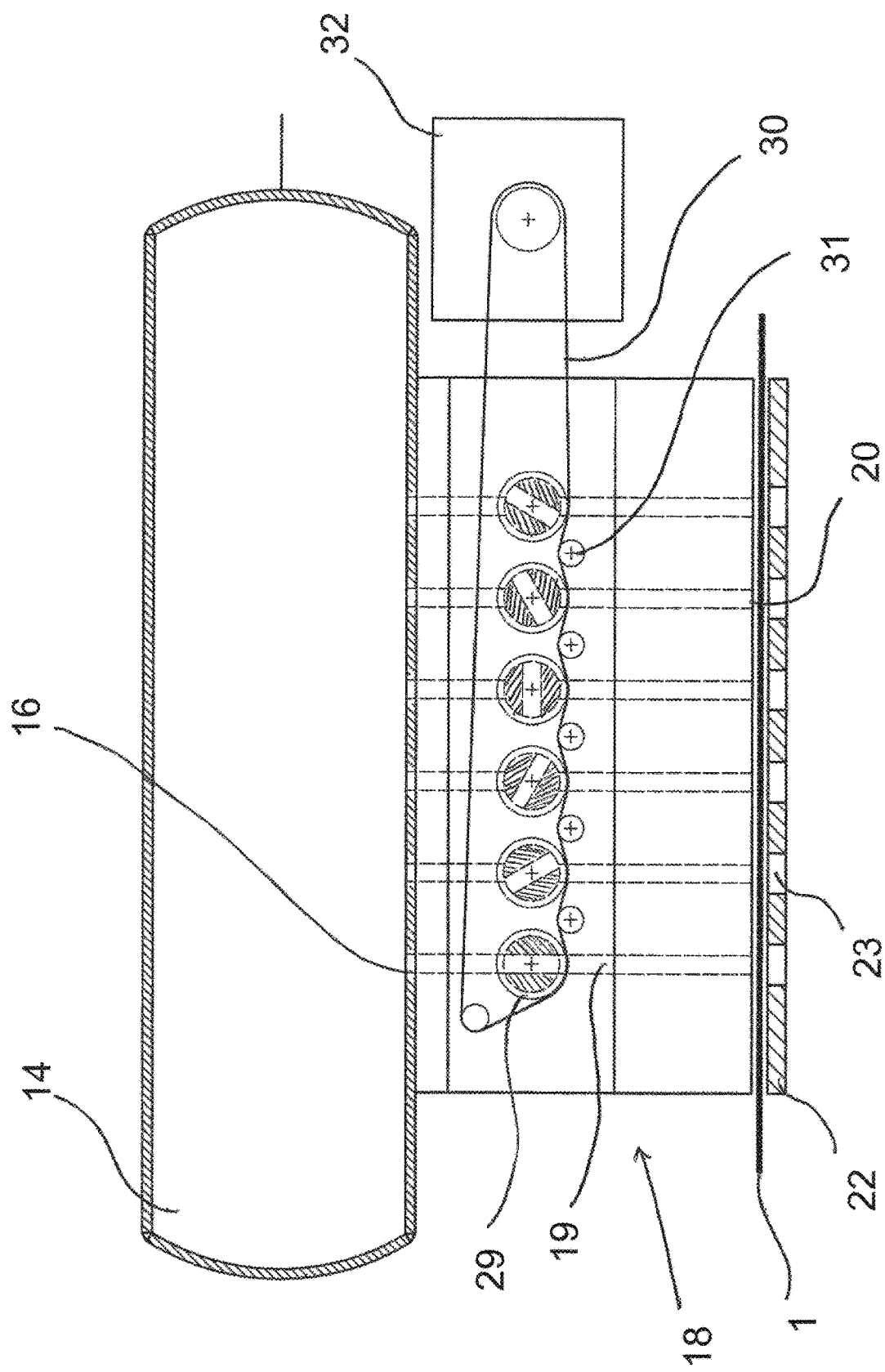
FIGS. 10 and 11 show versions of the driving means for driving the perforating device.
Figure 11:
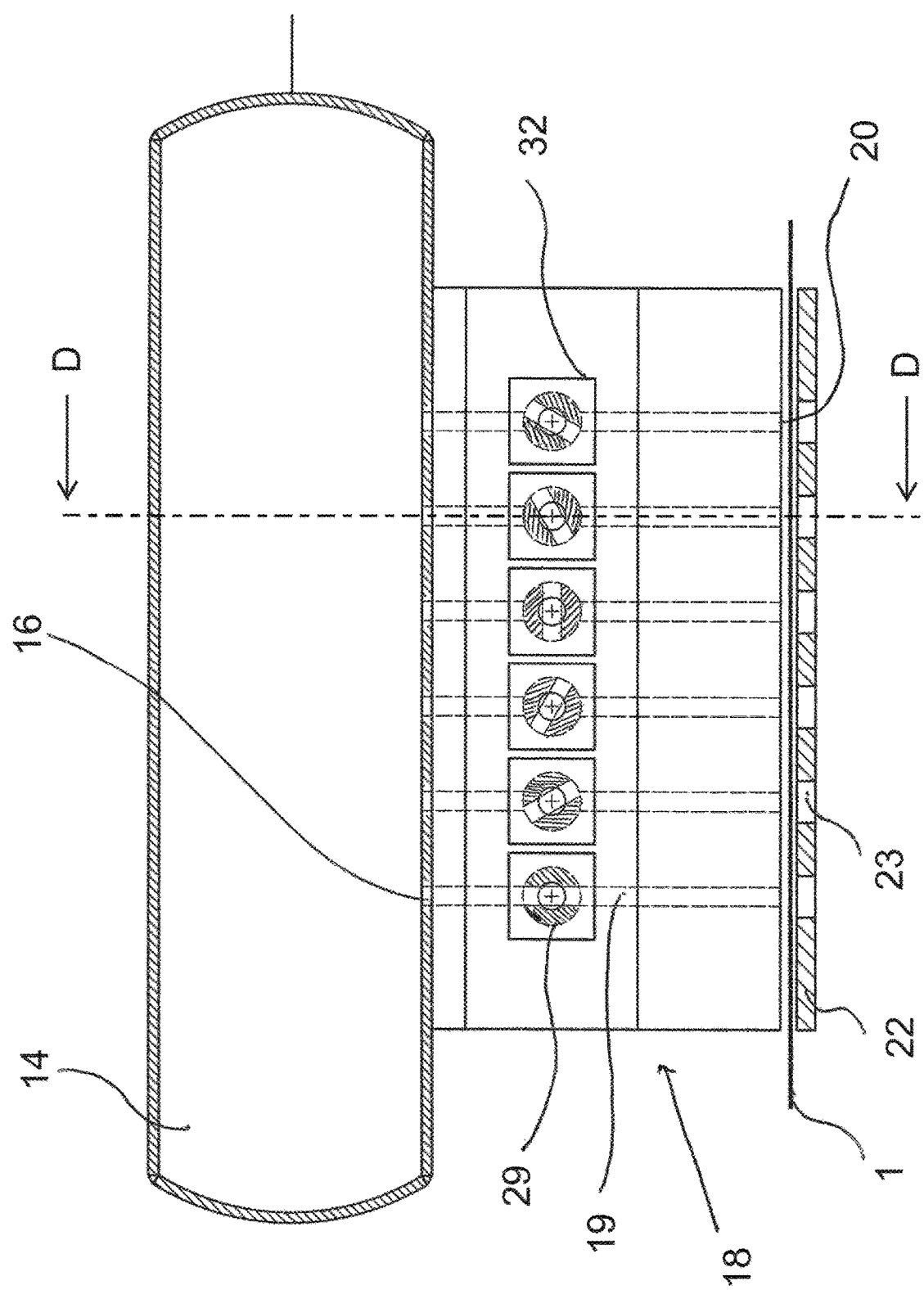
Figure 12:
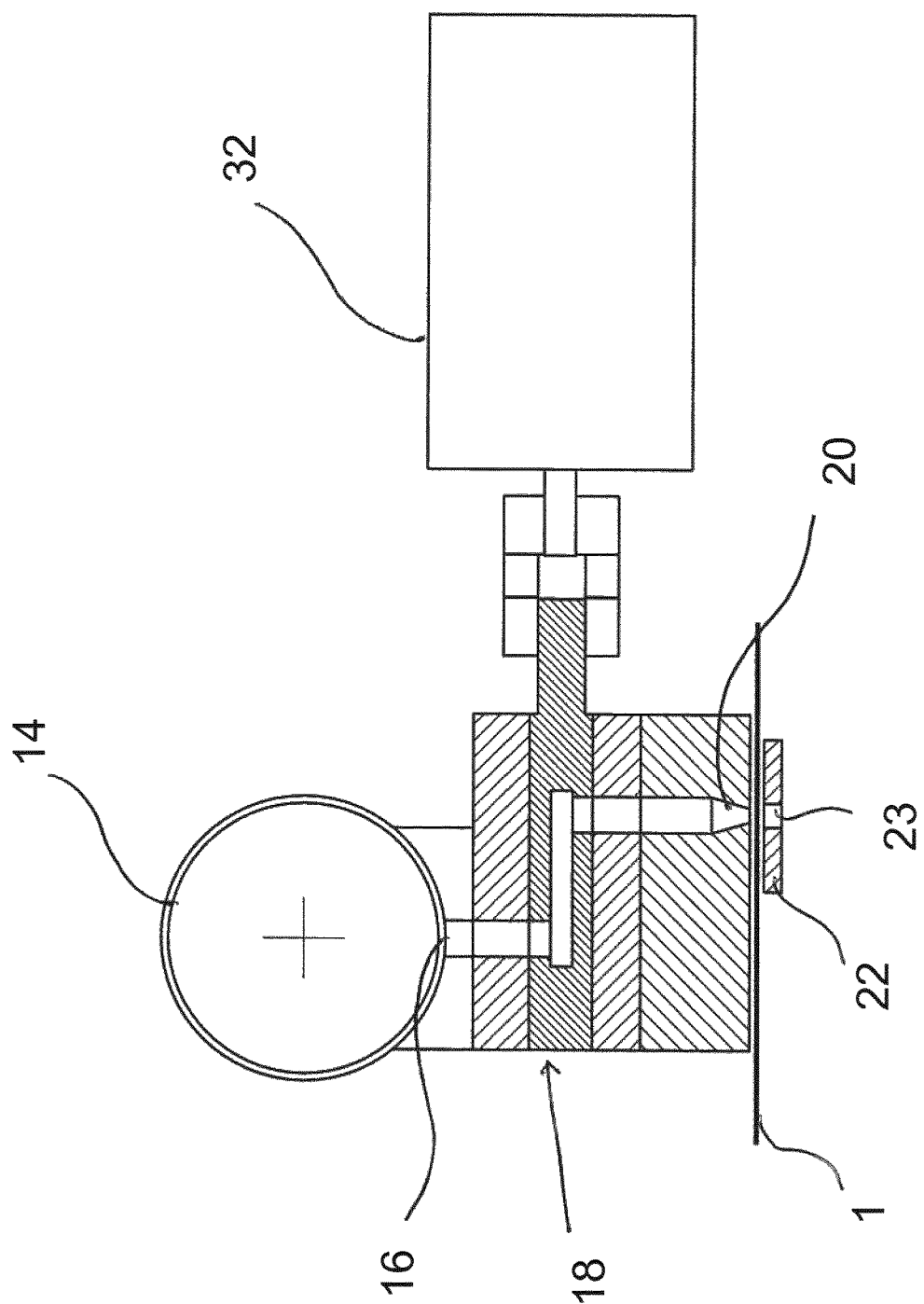
FIG. 12 shows a section D-D of FIG. 11.
Figure 13:
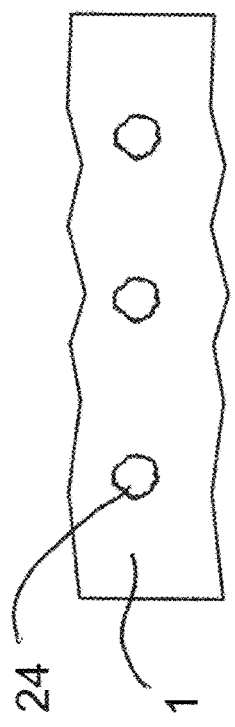
FIGS. 13, 14, 15 and 16 show different views of the perforated film of plastic material.

The valve device 21 and the actuating elements comprise in an embodiment shown in FIG. 2 a linearly movable element consisting of a suitably shaped and perforated plate at the conveying channels 19 of the pressurised hot gas jets, operationally connected to an advancement device for advancing the main film 1. This plate is movable alternatively between a first position of complete closure of the conveying channels 19 and a second position of complete opening of the conveying channels 19 and operationally connected to an advancement device for advancing the main film 1. A second embodiment, shown in FIG. 3, provides for the use of shutter valves 29 that, rotating, open and close the conveying channels 19. Such shutter valves 29 can be all driven together by a single motor 32 or singly, or each shutter valve 29 is provided with its own motor 32 (FIGS. 11, 12). Alternatively, the shutter valves 29 are phase adjusted mechanically by a belt 30 and pulleys 31, as visible in FIG. 10.

The hot gas distributor 18, at the conveying channels 19, comprises additional heating device 28 configured for maintaining the hot gas jets at a temperature near that maintained inside the storage tank 14 of the hot gas.

Figure 4:
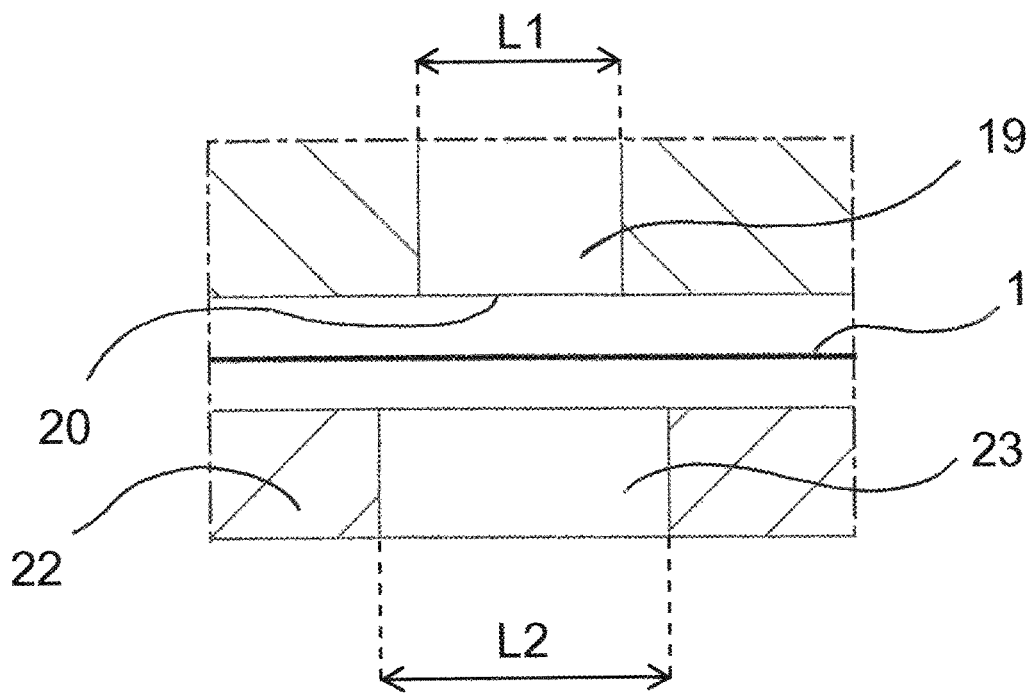
FIG. 4 shows a detail A of FIG. 2 before perforating.
Figure 5:
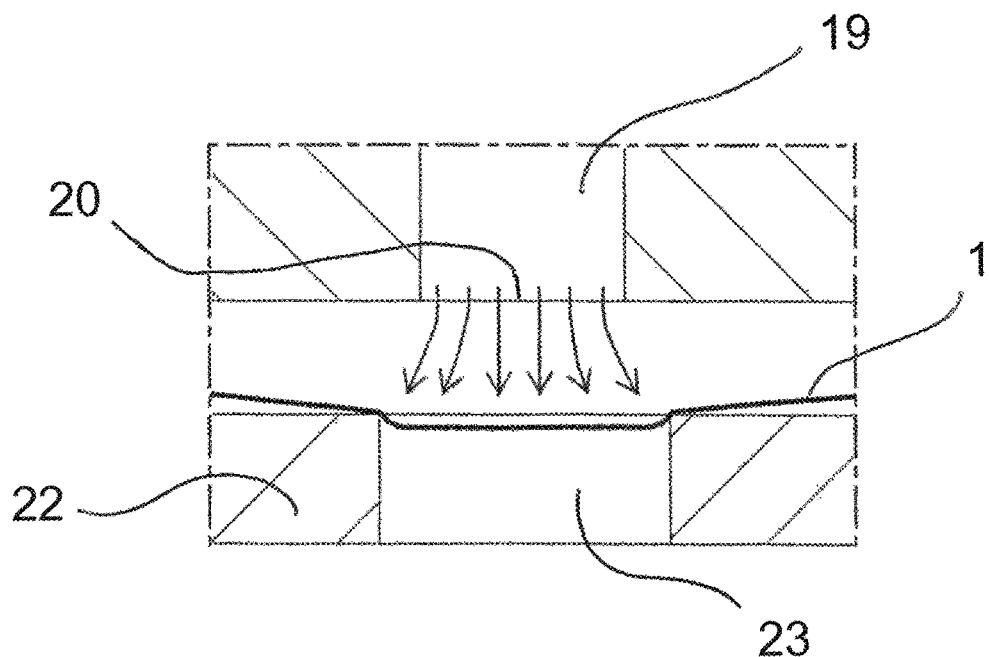
FIG. 5 shows the detail A of FIG. 2 during perforating.
Figure 6:
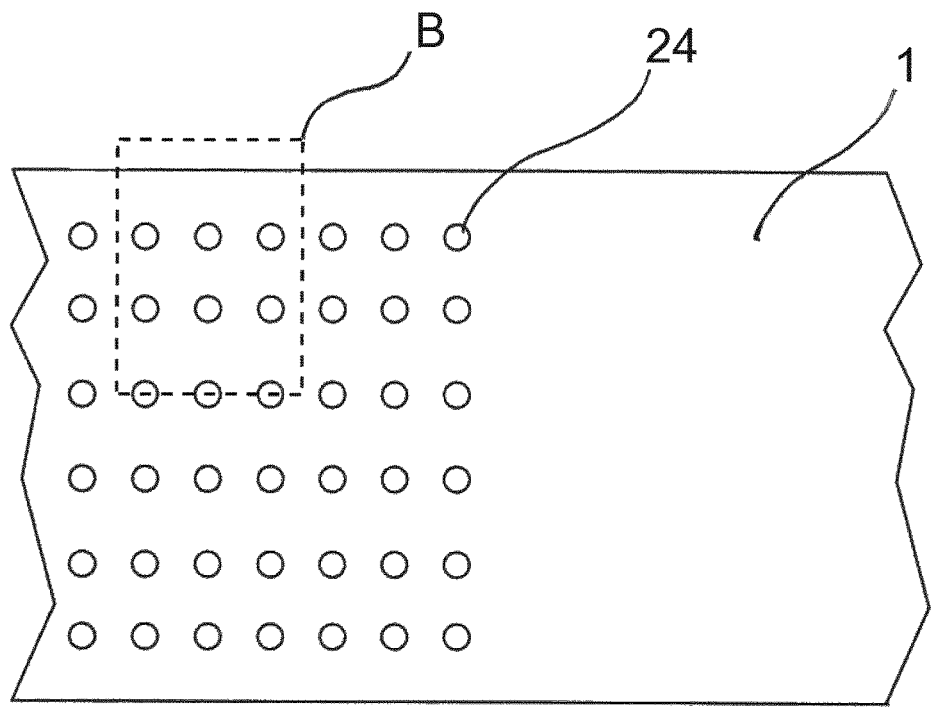
FIG. 6 shows a portion of the film with base holes.
Figure 7:
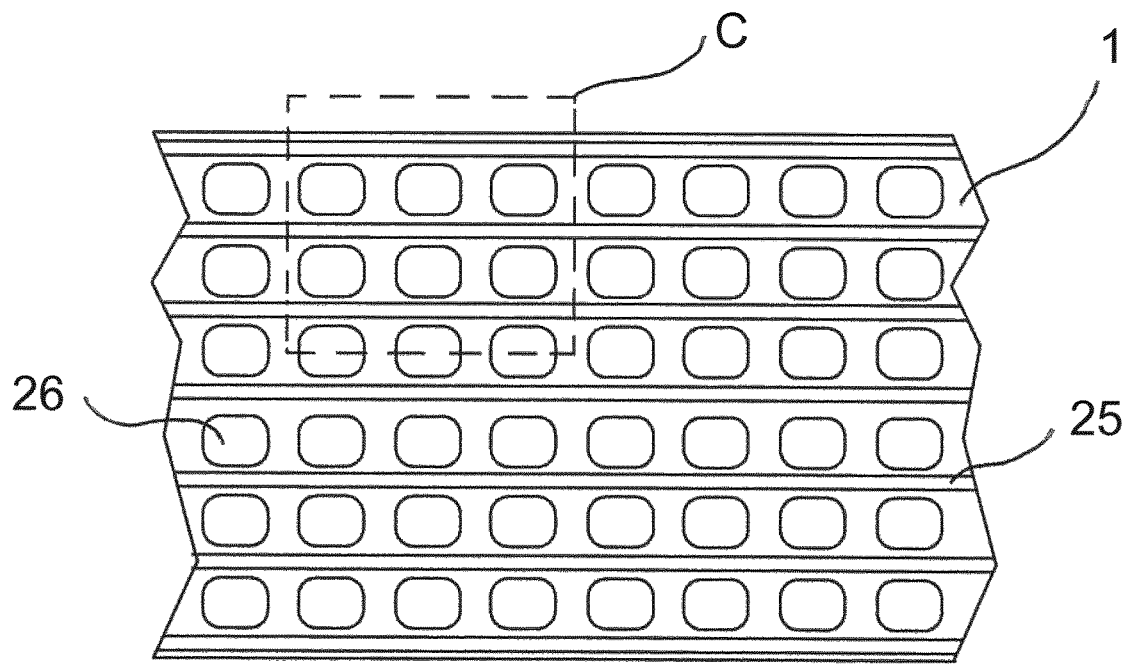
FIG. 7 shows a portion of the perforated and stretched film.
Figure 8:
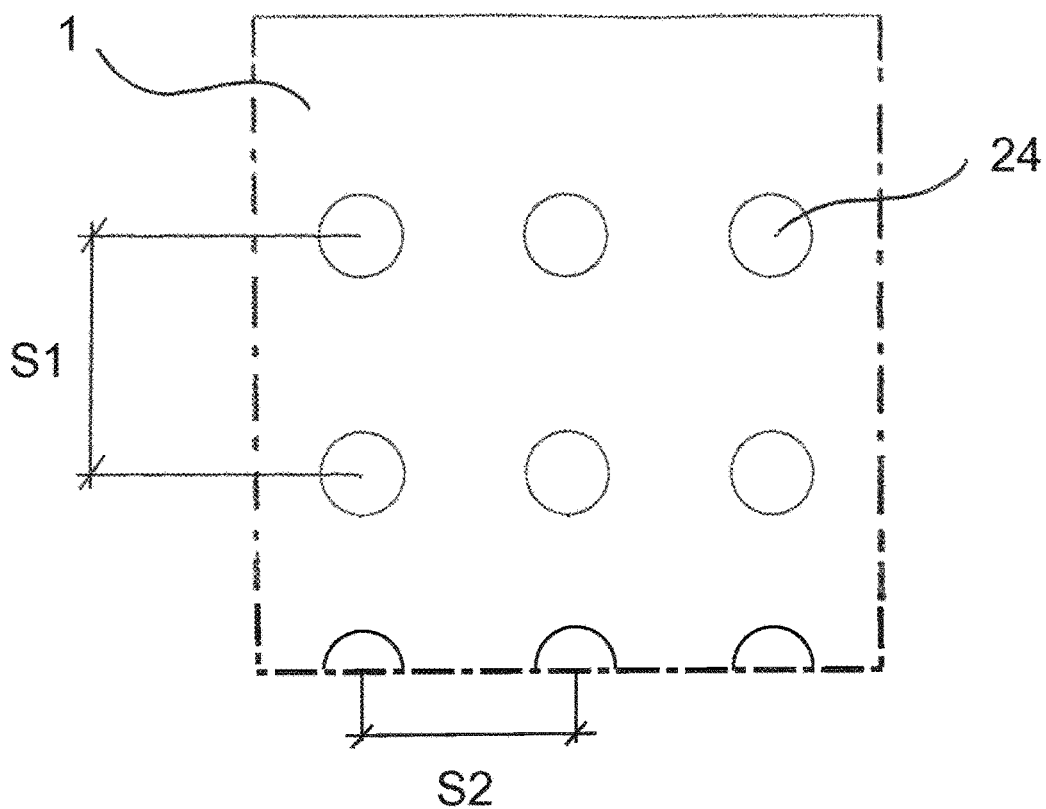
FIG. 8 shows a detail B of FIG. 6.
Figure 9:
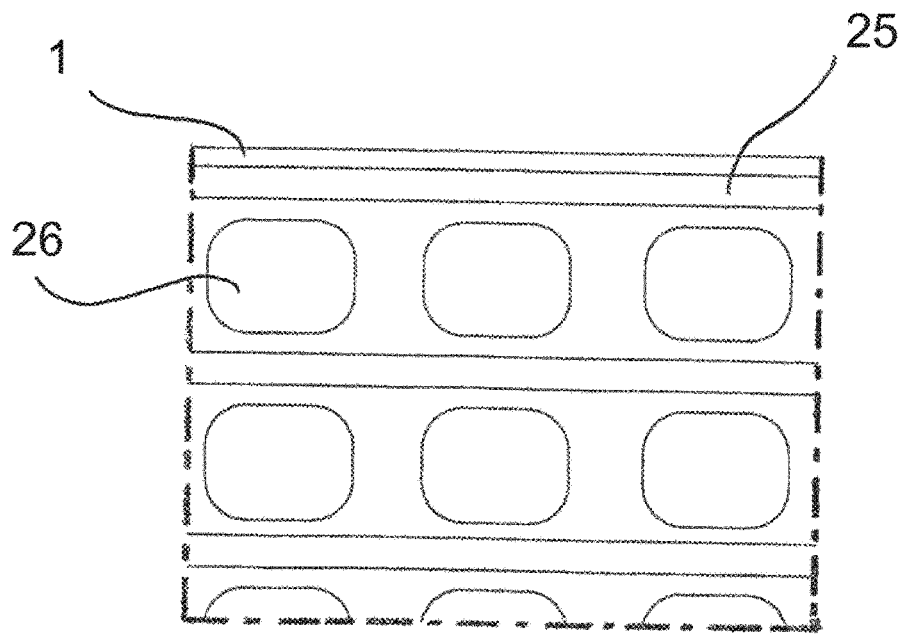
FIG. 9 shows a detail C of FIG. 7.

As visible in detail in FIGS. 4 and 5, the distance between the nozzles 20 of the distributor 18 and the perforating template 22 is comprised between 0.5-2 mm. The film slides at a distance comprised between 0.25 mm and 2 mm from the nozzles 20. The surface of the main film 1 opposite the nozzles 20 slides on a perforating template 22. The perforating template 22 is then positioned below the nozzles 20 generating the hot gas jets. The perforating template 22, at each nozzle 20, is configured with an elongated opening 23 along the direction that is transverse to the advancement of the main film 1, which is suitable for enabling a base hole 24 to be made in the main film 1.

Still with reference to FIGS. 4 and 5, the elongated openings 23 of the perforating template 22 have dimensions comprised between 12.0-14.0 mm in a direction that is transverse to the advancement direction of the main film 1 and between 2.5-4.0 mm along the advancement direction of the main film 1. The elongated openings 23 of the perforating template 22 have for example an elongated configuration having the greater axis L2 oriented transversely to the advancement direction of the main film 1; the nozzles 20 of the gas distributor 18 have an elongated configuration having the greater axis L1 oriented transversely to the advancement direction of the main film 1, such that L1<L2. Each elongated opening 23 of the perforating template 22 is so positioned as to enter the theoretical cone formed by the extension of the inner walls of the corresponding nozzle 20.

During the formation of the base holes 24, the main film 1 is pressed against the perforating template 22 by the pressure of the hot gas jets (detail in FIG. 5) such that it is made to penetrate instantaneously into openings 23 of the perforating template 22.

The base holes 24 of the main film 1 match the elongated openings 23 of the perforating template 22.

The perforating template 22 is so configured that the longitudinal pitch S2 between the rows of holes is equal to or greater than 20 mm and the transverse pitch S1 is the same as or greater than 50 mm.

The pitch between the holes can remain constant between one row and the other of holes or can be varied.

The rows of holes can be aligned (FIG. 17) or not (FIGS. 18-20), staggered by an angle α comprised between 30 and 90°, whereas the reinforcing bands 25 can be applied in a different number and with different spatial distribution (FIGS. 17-20).

The distribution of the nozzles 20 enables a ratio A1/A2 to be obtained between the perforated area A1 and the non-perforated area A2 of the main film 1 that is equal to or greater than 0.1 (after prestretching).

The ratio B1/B2 between the area B1 of the nozzles 20 of the hot gas distributor 18 and the area B2 of the openings 23 of the template 22 is comprised between 0.3-0.8.

The high temperature of the hot gas jets enables base holes 24 of the main film 1 with reinforced edges to be obtained: this enables cuts, tears or splits of the main film 1 at the holes to be avoided.

Figure 14:
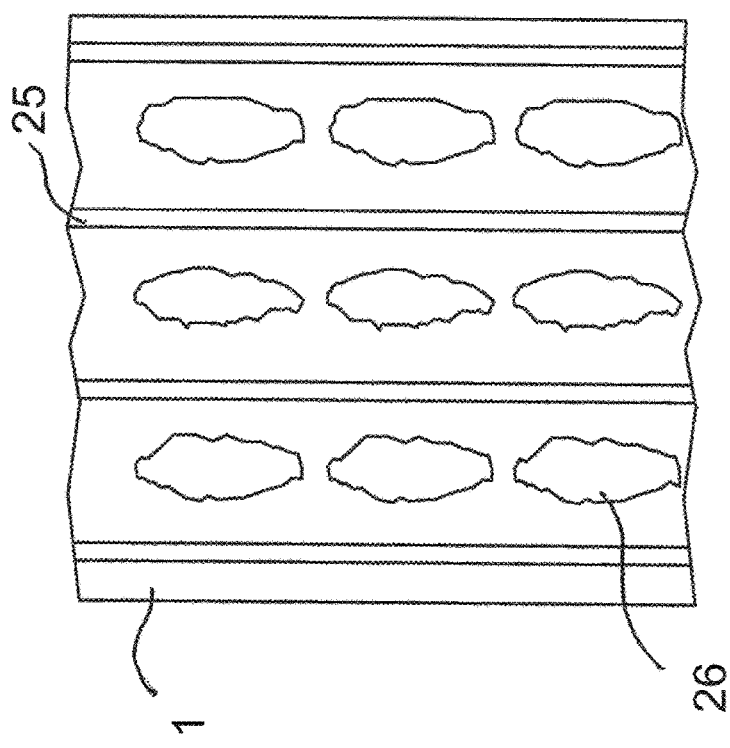
Figure 15:
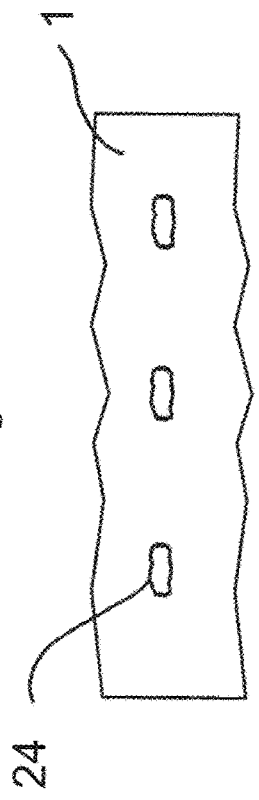
Figure 16:
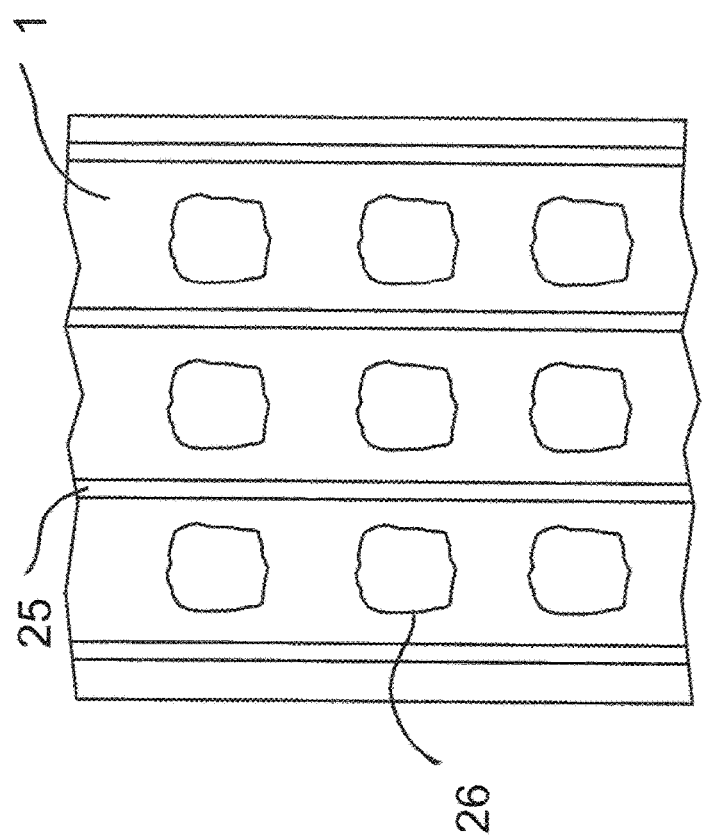
Figure 17:
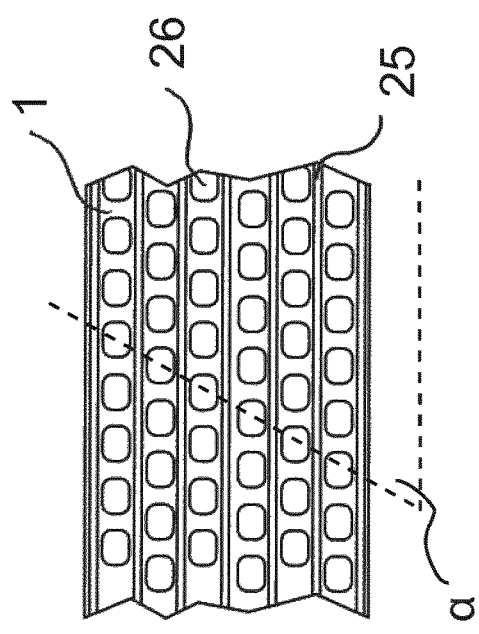
FIGS. 17, 18, 19 and 20 show the perforated film in different configurations.
Figure 18:
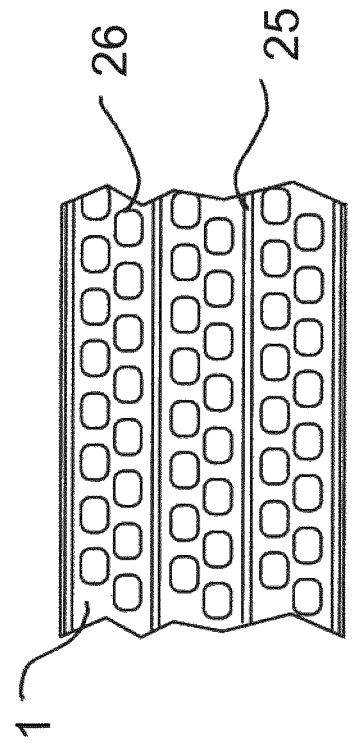
Figure 19:
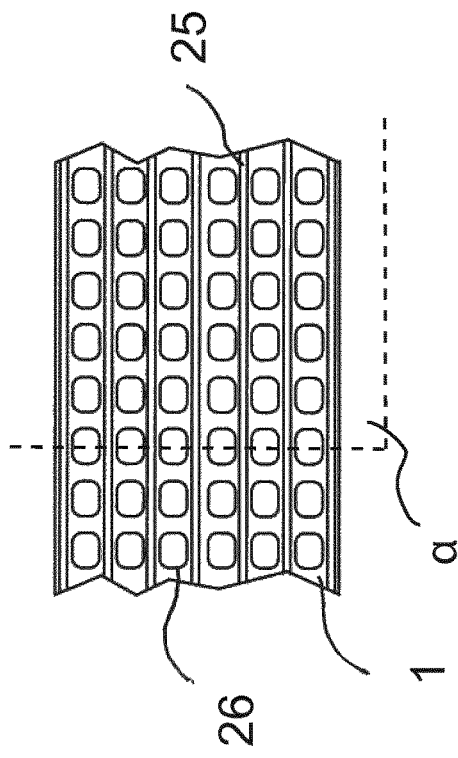
Figure 20:
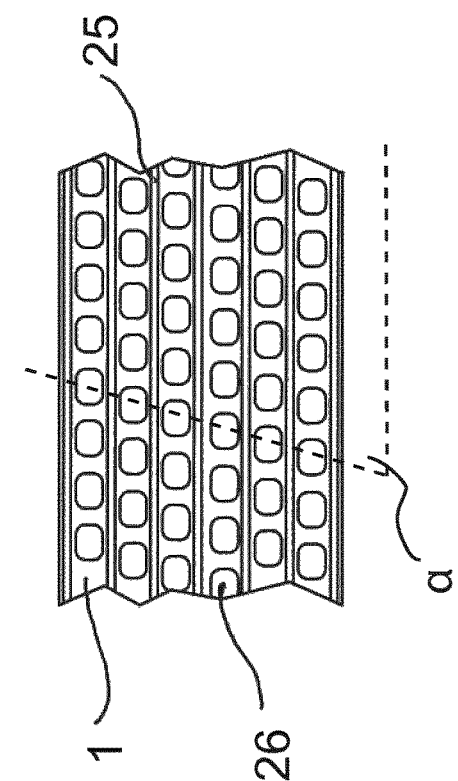

In particular, it is important to press the main film 1 against the perforating template 22, making the main film 1 penetrate instantaneously into the openings 23 through the pressure of the hot gas jets in order to obtain holes with well-defined contours that are free of tears and/or jagged edges (FIG. 15). In such conditions, following the second stretching, the perforated main film 1 is obtained, stretched again with a desired stretching percentage (FIG. 16). By not pressing the main film 1 instantaneously during the perforating step, holes are on the other hand obtained with irregular edges 13. In the subsequent stretching step, breaks and/or slits in the material could be generated and consequently the elongated holes 26 could have an irregular shape or be arranged at distances from one another that do not conform to what is desired (FIG. 14). Further, a break of the film at the elongated holes 26 could cause a reduction of the distance between the holes of each row of holes and less ability to withstand longitudinal stress to the film.

Advancement of the film is interrupted only at the instant in which the jet of hot air hits the film, making the film penetrate the openings 23: from a macroscopic point of view, advancement of the main film 1 is constant owing to the elastic properties thereof, in the specific case both upstream and downstream of the perforating device 5.

The main film 1 is advanced to a first stretching station, where there is a first stretching device 7. Subsequently, the stretched main film 1 is first advanced to a perforating device 5 and subsequently to a station applying the reinforcing bands 25, where there is also a second stretching device 9.

Alternatively, the main film 1 is advanced directly to a perforating device 5, without being stretched in the first stretching device 7.

Simultaneously to unwinding of the main film 1, an auxiliary film 2 of plastic material is unwound from an auxiliary unwinding device 4 and moved to a device for longitudinal cutting 6 to form strips 27 of plastic material from the auxiliary film 2. The auxiliary unwinding device 4 is driven by a motor, the latter operationally connected to the central control unit.

The auxiliary film 2 has a thickness comprised between 10-40 μm.

The cutting device 6 can comprise blades or other cutting elements.

Subsequently, the auxiliary film 2 is advanced to a folding device for folding the side edges 8 of the strips 27 of the auxiliary film 2 to form the reinforcing bands 25.

This operation consists of cutting into strips 27 the auxiliary film 2 and forming the reinforcing bands 25 by folding the side edges of the strips 27 of auxiliary film 2, before adhesion to the main film 1.

Once formed, the reinforcing bands 25 are connected to the main film 1 making the reinforcing bands 25 adhere between parallel rows of holes. This operation is performed in a station for applying the reinforcing bands 25 located downstream of the perforating device 5 and upstream of a second stretching device 9 of the main film 1.

The reinforcing bands 25 have a width comprised between 5-25 mm.

The first stretch or prestretch is then made on the main film 1 before perforating; the second stretch is made on the perforated main film 1 subsequently to the application of the reinforcing bands 25.

The main film 1, once it has been perforated and provided with reinforcing bands 25, is advanced as far as a second stretching station where there is a second stretching device 9. The perforated and reinforced main film 1 can be, for example, further stretched with percentages comprised between 100% and 400% with respect to the perforated and not yet reinforced main film 1.

The stretching operations enable the base holes 24 to be elongated, whilst the perforated main film 1 is moved in the longitudinal advancement direction. The dimension of the elongated holes 26 that is obtained depends on the stretch percentages applied.

FIGS. 6, 7, 8 and 9 show respectively a portion of main film 1 with base holes 24, a portion of perforated and stretched main film 1, a detail of the portion of main film 1 with base holes 24 and a detail of the portion of perforated and stretched main film 1 with elongated holes 26.

In the non-limiting embodiment shown in FIG. 1, after the reinforcing bands 25 have been applied the main film 1 is passed inside an oscillator 12 to obtain better final winding. Final winding is performed by a final winding device 13 to obtain a reel of perforated film of plastic material, which is stretched and provided with reinforcing bands 25. The final winding device 13 is driven by a motor, the latter operationally connected to the central control unit.

The first and second stretching and applying the reinforcing bands 25 occur by moving the main film 1 at an advancement speed of typically 200 m/min, before stretching.

The unwinders 3 and 4, the winder 13, the stretching devices 7 and 9, the cutting device 6, the edge-folding device 8 and the perforating device 5 can be driven by motors that are operationally connected to the central control unit.

It is clear that variations on and/or additions to what has been disclosed previously can be added.

The configuration of the components of the apparatus disclosed above can be different from what has been illustrated previously.

The distributor 18 can be driven by other hydraulic and/or pneumatic and/or mechanical systems different from what has been disclosed.

In the non-limiting representation of the perforating device 5 in FIGS. 1-5, the gas in the tank 14 and in the valve device 21 is heated by an electric resistance: the gas can nevertheless be heated by systems different from the resistance, for example secondary circuits in which other hot fluid circulates.

The invention claimed is:

1. A method for perforating a film of plastic material, wherein a main film is perforated whilst it is slid through a perforating device, and wherein reinforcing bands are formed from an auxiliary film made of plastic material, and wherein said reinforcing bands are connected and made to adhere between parallel rows of base holes of the main film; and subsequently the perforated main film with the reinforcing bands is stretched in a longitudinal sliding direction, wherein:
   a pressurised hot gas source is provided, having a temperature above the melting temperature of the main film;
   a plurality of pressurised hot gas jets correlated with a sliding speed of the main film is generated sequentially; and the main film of plastic material is perforated by pressing the main film of plastic material against a perforating planar template, which is stationary with respect to the plurality of hot gas jets and opposite to the perforating device, and the main film of plastic material is made to instantaneously penetrate openings of the perforating planar template by said plurality of hot gas jets, wherein the plurality of pressurized hot gas jets is controlled by an actuating element of a valve device for cyclically connecting the pressurized hot gas source to the pressurized hot gas jets in synchronism with an advancement movement of the main film, wherein said actuating element of the valve device comprises a plurality of rotating shutters operationally connected to a mechanical system to synchronize said advancement movement of said main film and wherein said actuating element of a valve device is driven by a single motor and is operatively connected with the advancement of the main film.

2. The method for perforating a film made of plastic material according to claim 1, wherein the main film is not stretched before perforating.

3. The method for perforating a film made of plastic material according to claim 2, wherein the main film is stretched before perforating, with a prestretch percentage comprised between more than 0% and 200%.

4. The method for perforating a film made of plastic material according to claim 3, wherein the main film is stretched further, with a stretch percentage comprised between 100% and 400% with respect to the prestretched main film, following adhesion of the reinforcing bands.

5. The method for perforating a film made of plastic material according to claim 1, wherein the auxiliary film is cut into strips and the reinforcing bands are formed by folding the side edges of the strips of auxiliary film, before adhesion to the main film.

6. The method for perforating a film made of plastic material according to claim 1, wherein the main film has a thickness between 10-40 μm.

7. The method for perforating a film made of plastic material according to claim 1, wherein the auxiliary film has a thickness between 10-40 μm.

8. The method for perforating a film made of plastic material according to claim 1, wherein the reinforcing bands has a width comprised between 5-25 mm.

9. The method for perforating a film made of plastic material according to claim 1, wherein the longitudinal pitch between the holes of the rows of base holes is equal to or greater than 20 mm and the transverse pitch between rows of contiguous holes is equal to or greater than 50 mm.

10. The method for perforating a film made of plastic material according to claim 1, wherein a ratio A1/A2 between a perforated area and a non-perforated area of the main film is equal to or greater than 0.1.

11. The method for perforating a film made of plastic material according to claim 1, wherein stretching and applying the reinforcing bands occur by moving the main film at an advancement speed that is of 200 m/min.

12. A method for perforating a film of plastic material, wherein a main film is perforated whilst it is slid through a perforating device, and wherein reinforcing bands are formed from an auxiliary film made of plastic material, and wherein said reinforcing bands are connected and made to adhere between parallel rows of base holes of the main film; and subsequently the perforated main film with the reinforcing bands is stretched in a longitudinal sliding direction, wherein:

a pressurised hot gas source is provided, having a temperature above the melting temperature of the main film;

a plurality of pressurised hot gas jets correlated with a sliding speed of the main film is generated sequentially; and the main film of plastic material is perforated by pressing the main film of plastic material against a perforating planar template which is stationary with respect to the plurality of hot gas jets and opposite to the perforating device, and the main film of plastic material is made to instantaneously penetrate openings of the perforating planar template by said jets of hot gas wherein the main film is stretchable or heat-shrinkable, wherein the plurality of pressurized hot gas jets is controlled by an actuating element of a valve device for cyclically connecting the pressurized hot gas source to the pressurized hot gas jets in synchronism with an advancement movement of the main film, wherein said actuating element of the valve device comprises a plurality of rotating shutters operationally connected to a mechanical system to synchronize said advancement movement of said main film; and wherein said actuating element of a valve device is driven by a single motor and is operatively connected with the advancement of the main film.

\* \* \* \* \*